United States Patent Office 3,701,754
Patented Oct. 31, 1972

3,701,754
PREPARATION OF THERMOSETTING COMPOSITIONS AND THERMOSET RESINS FROM POLYMERS OF N - 3 - OXOHYDROCARBON-SUBSTITUTED ACRYLAMIDES
Eugene Richard Farone, Mentor-on-the-Lake, Ohio, assignor to The Lubrizol Corporation, Wickliffe, Ohio
No Drawing. Continuation of abandoned application Ser. No. 817,577, Apr. 18, 1969. This application Nov. 30, 1970, Ser. No. 93,818
Int. Cl. C08g 1/18, 3/00
U.S. Cl. 260—64
14 Claims

ABSTRACT OF THE DISCLOSURE

Thermosetting polymers are prepared by the reaction of an aldehyde with a homopolymer or interpolymer of an N-3-oxohydrocarbon-substituted acrylamide (such as diacetone acrylamide) in the presence of a strongly alkaline catalyst. The thermosetting reaction is effected by heating, usually in the presence of an alkaline compound. The thermoset resins are useful as surface coatings, especially for metal surfaces.

---

This application is a continuation of copending application Ser. No. 817,577, filed Apr. 18, 1969, now abandoned, which in turn is a continuation-in-part of copending application Ser. No. 745,375, filed July 17, 1968 now abandoned.

This invention relates to polymeric compositions of matter and methods for making them. More particularly, it relates to a method for the preparation of a thermosetting polymeric composition of matter which comprises reacting, in the presence of a strongly alkaline reagent, an aldehyde with a polymer of an N-3-oxohydrocarbon-substituted acrylamide of the formula

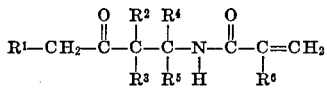

wherein each of $R^1$, $R^2$, $R^3$, $R^4$ and $R^5$ is hydrogen or a hydrocarbon radical and $R^6$ is hydrogen or a lower alkyl radical, the molar ratio of said aldehyde to the N - 3 - oxohydrocarbon - substituted acrylamide units in said polymer being between about 0.1:1 and 4:1.

As used herein, the term "hydrocarbon radical" denotes alkyl, cycloalkyl, aryl, alkaryl and aralkyl radicals. It also includes substantially hydrocarbon radicals; that is, radicals containing substituents such as ether, ester, nitro and halogen so long as such substituents do not materially alter the character or reactivity of the radical. The term "lower alkyl radical" denotes alkyl radicals containing no more than about 10 carbon atoms.

The N - 3 - oxohydrocarbon-substituted acrylamides used as reactants in the method of this invention are disclosed and claimed in U.S. Pats. 3,277,056 and 3,425,-942, the disclosures of which are hereby incorporated by reference in the present specification. Preferred among these compounds are those represented by the above formula wherein $R^1$ is hydrogen or alkyl, $R^4$ and $R^5$ are alkyl or aryl, $R^2$ and $R^3$ are hydrogen, and $R^6$ is hydrogen or methyl. Particularly preferred are N-(1,1-dimethyl - 3 - oxobutyl)acrylamide, hereinafter referred to as diacetone acrylamide, and N-(1,1 - dimethyl - 3 - oxobutyl) - methacrylamide, hereinafter referred to as acetone methacrylamide. Reference to diacetone acrylamide will frequently be made hereinafter; it should be understood that the other N-3-oxohydrocarbon-substituted acrylamides are equivalent thereto.

The above-noted patents also disclose methods for preparing polymers of N - 3 - oxohydrocarbon-substituted acrylamides. As used herein, the word "polymer" includes homopolymers, copolymers, terpolymers and other interpolymers. Interpolymers are preferred; suitable intermonomers which may be used in the preparation thereof are disclosed in the above-noted patents. Preferred intermonomers are vinyl aromatic compounds such as styrene and esters of unsaturated acids, typically acrylic or methacrylic acid, such esters being illustrated by ethyl acrylate, methyl methacrylate and 2-ethylhexyl acrylate. Also especially suitable are vinyl esters of saturated carboxylic acids, vinyl ethers, olefinic hydrocarbons, vinyl halides and unsaturated nitriles.

The polymer should contain at least about 5% (by weight) diacetone acrylamide units. A polymer containing less than this amount appears to be unsatisfactory in that it does not produce a suitable thermosetting resin.

Aldehydes suitable for use in the method of this invention include formaldehyde, acetaldehyde, propionaldehyde, the butyraldehydes, furfural, benzaldehyde and β-phenylacetaldehyde. The most suitable aldehydes are the aliphatic ones containing less than about 5 carbon atoms, namely formaldehyde, acetaldehyde, propionaldehyde and the butyraldehydes. For reasons of convenience, economy and ease of preparation, formaldehyde is especially preferred among these. It may be used as the pure monomeric aldehyde, as an aqueous solution, as a reversible polymer (e.g., paraformaldehyde) or as a solution in a polar solvent, typically an alcohol. The latter of these is preferred, and it is frequently convenient to use formaldehyde in the form of a solution containing 40% formaldehyde, 54% n-butyl alcohol and 6% water. Solutions of this type are commercially available and are sold under the trade name "Butyl Formcel."

The molar ratio of aldehyde to diacetone acrylamide units in the polymer should be between about 0.1:1 and 4:1. A ratio from 1:1 to 3:1 is particularly useful.

The method of this invention is carried out by merely mixing the diacetone acrylamide polymer and the aldehyde in the presence of a strongly alkaline reagent. Suitable alkaline reagents include sodium hydroxide, potassium hydrxide and quaternary ammonium hydroxides. The amount of alkaline reagent is not critical but it is generally unnecessary to use more than about 5%, based on the total weight of polymer in the mixture. Frequently, 1% or less is suitable.

It is generally desirable to carry out the reaction in a solvent which is relatively inert to the reaction. Typical solvents include benzene, toluene, xylene, tetrahydrofuran, ethyl ether, methanol, n-butyl alcohol, isobutyl alcohol, heptane, kerosene, and trichloroethylene. Where a solution of formaldehyde in n-butyl alcohol is used as a reagent, it is frequently convenient to use n-butyl alcohol as the reaction solvent also.

If the reaction is allowed to proceed for a long enough period of time, it may be carried out at room temperature. However, it is somewhat slow at room temperature and therefore an elevated temperature up to about 150° C. is preferred. It is usually unnecessary to purify the product or remove the solvent before using the composition for the purposes described hereinafter.

While the precise molecular structures of the compositions made by the method of this invention are not known, it is known that the method results in the substitution of hydroxyalkyl groups for one or more of the hydrogen atoms on the carbons alpha to the keto carbonyl group. It will be apparent that in the case of diacetone acrylamide polymers, there are five such hydrogen atoms capable of substitution. Depending on the ratio of aldehyde to diacetone acrylamide, from 1 to 5 of these hydrogen atoms may be substituted. When the aldehyde is formaldehyde, the substituents are hydroxymethyl (methylol) groups.

A secondary reaction, which takes place when the method of this invention is carried out in an alcohol as solvent, involves the condensation of the hydroxyalkyl groups with molecules of the alcohol to form alkyl ethers. Thus, the reaction of a diacetone acrylamide polymer with formaldehyde in n-butyl alcohol gives a product containing, as substituents on the carbon atoms alpha to the keto carbonyl groups of the polymer, hydroxymethyl and n-butoxymethyl radicals.

Copending applications Ser. No. 751,715, filed Aug. 12, 1968, and Ser. No. 833,162, filed June 13, 1969, disclose and claim polymers formed by the reaction of diacetone acrylamide (or homologous and analogous compounds) with an aldehyde such as formaldehyde and subsequent polymerization of the compositions thus formed. Such polymers form no part of the present invention. It is believed that they are identical or similar in structure to the polymers prepared by the method of this invention, although the latter are characterized in many instances by solubility in various polar solvent systems while the former are ordinarily obtained as suspensions or emulsions. The difference may be one of molecular weight or one of structure; however, it is to be understood that the present invention is not dependent on the solubility of the polymeric compositions formed thereby.

The method of this invention is illustrated by the following examples. All parts, percentages and proportions are by weight unless otherwise indicated.

EXAMPLES 1–9

A terpolymer of diacetone acrylamide, styrene and ethyl acrylate is prepared by polymerization of 30 parts of diacetone acrylamide, 33 parts of styrene and 37 parts of ethyl acrylate in n-butyl alcohol solution, using a cumene hydroperoxide catalyst and a tertiary dodecyl mercaptan chain transfer agent. The average molecular weight of the terpolymer is about 6000. It is obtained as a 50% solution in n-butyl alcohol.

The copolymer solution is mixed with Butyl Formcel and an alkaline catalyst, either a 10% solution of potassium hydroxide in n-butyl alcohol or a 20% solution of tetramethylammonium hydroxide in methanol, is added. The mixture is placed in a sealed bottle and heated at 85° C. for three hours, with agitation. The composition of the resulting methylolated derivatives of the terpolymers and/or butyl ethers thereof are given in Table I.

TABLE I

| Example: | Mole ratio, formaldehyde/ diacetone acrylamide | Catalyst | Percent catalyst (based on polymer) |
|---|---|---|---|
| 1 | 2:1 | KOH | 0.38 |
| 2 | 1.5:1 | KOH | 0.38 |
| 3 | 1:1 | KOH | 0.38 |
| 4 | 0.5:1 | KOH | 0.38 |
| 5 | 0.1:1 | KOH | 0.38 |
| 6 | 1:1 | KOH | 0.19 |
| 7 | 1:1 | KOH | 0.76 |
| 8 | 1:1 | (CH$_3$)$_4$NOH | 0.39 |
| 9 | 1:1 | (CH$_3$)$_4$NOH | 0.20 |

EXAMPLES 10–14

Following the procedure of Examples 1–9, formaldehyde is reacted with a 50% solution in n-butyl alcohol of a 15:40:45 terpolymer of diacetone acrylamide, styrene, and ethyl acrylate. The proportions of reagents used are given in Table II.

TABLE II

| Example: | Mole ratio, formaldehyde/ diacetone acrylamide | Catalyst | Percent catalyst (based on polymer) |
|---|---|---|---|
| 10 | 2:1 | (CH$_3$)$_4$NOH | 0.22 |
| 11 | 1:1 | (CH$_3$)$_4$NOH | 0.22 |
| 12 | 2:1 | KOH | 0.21 |
| 13 | 1:1 | KOH | 0.21 |
| 14 | 4:1 | KOH | 0.21 |

EXAMPLE 15

A mixture of 1837 parts of a terpolymer similar to that used in Examples 10–14, 183 parts of Butyl Formcel, 3.12 parts of potassium hydroxide and 130 parts of n-butyl alcohol is heated to 105° C., under nitrogen, with stirring, for 3 hours. It is then cooled to room temperature, yielding a viscous, hazy liquid which is a 52% solution in n-butyl alcohol of the desired product containing a 3:1 mole ratio of formaldehyde to diacetone acrylamide units in the polymer.

EXAMPLE 16–19

Following the procedure of Examples 1–9, formaldehyde is reacted with a 7:41:52 terpolymer of diacetone acrylamide, styrene and ethyl acrylate. The catalyst in each instance is potassium hydroxide. The ratios of reactants used are given in Table III.

TABLE III

| Example: | Mole ratio, formaldehyde/ diacetone acrylamide | Percent catalyst (based on polymer) |
|---|---|---|
| 16 | 2:1 | 0.21 |
| 17 | 1:1 | 0.21 |
| 18 | 2:1 | 0.11 |
| 19 | 1:1 | 0.11 |

EXAMPLE 20

To a mixture of 2778 parts of the n-butyl alcohol solution of the polymer used in Examples 1–9 and 465 parts of Butyl Formcel is added, with stirring, a solution of 4 parts of potassium hydroxide in 36 parts of n-butyl alcohol. The mixture is heated under reflux (about 108° C.) for 4 hours under nitrogen, with stirring. It is then distilled until 250 parts of volatile matter has been removed and cooled to 70° C. Toluene, 250 parts is added and the solution is stirred until it is clear, yielding a viscous yellow liquid which is the desired derivative of the polymer containing a 2:1 ratio of formaldehyde to diacetone acrylamide units. It is obtained as a solution containing 51.4% n-butyl alcohol and 7.6% toluene.

EXAMPLE 21

Following the procedure of Example 20, a 2:1 product is prepared from formaldehyde and a 38:29:33 terpolymer of diacetone acrylamide, styrene and ethyl acrylate. The product is a solution containing 51.4% n-butyl alcohol and 7.6% toluene.

EXAMPLES 22–24

Following the procedure of Example 15, 2:1 reaction products are prepared by the reaction of formaldehyde with various polymers of diacetone acrylamide, as follows:

Example 22—diacetone acrylamide homopolymer
Example 23—diacetone acrylamide-vinyl acetate 40:60 copolymer
Example 24—diacetone acrylamine-acrylonitrile 30:70 copolymer

EXAMPLE 25

The procedure of Example 15 is repeated, except that acetaldehyde is substituted for formaldehyde on an equimolar basis. A similar product is obtained.

The polymeric compositions prepared by the method of this invention may be thermoset at temperatures ranging from room temperature to about 300° C., preferably at least about 100° C. and usually about 100–200° C. Ordinarily, the polymer solution prepared as in the foregoing examples is heated without prior removal of solvent to prepare the thermoset resin. It will be noted that such solution still contains the alkaline reagent used to catalyze the reaction between the polymer and the aldehyde. While the presence of such alkaline reagent is not always necessary in order for the thermosetting reaction to occur, it is usually preferred since it permits the use of lower curing temperatures. Again, only a small amount of alkaline reagent is needed, generally less than 5% based on the weight of the polymer. However, it is sometimes necessary to add additional alkaline reagent. During the thermosetting reaction, especially when effected at high temperatures, the solvent evaporates leaving a hard, chemically resistant resinous material.

The precise nature of the thermosetting reaction is not known with certainty, but it is believed that it involves condensation of the hydroxyalkyl groups to form ether linkages between adjacent polymer molecules. Thus, the reaction is probably one of "crosslinking" or "curing." It will be noted, however, that the thermosetting reaction takes place whether the molecular species involved is hydroxyalkyl or alkoxyalkyl.

The compositions prepared by the method of this invention are especially useful for the preparation of protective films on metal and other surfaces. They may be applied to such surfaces in any of the usual ways such as brushing, spraying, dip-coating, flow-coating, roller-coating, drawing down and the like. In ordinary large-scale practice, spraying or roller-coating are preferred. Following the coating operation, the surface is baked, typically for 10–15 minutes at about 100–200° C., to form a thermoset film.

Protective films obtained by this method are permanent in nature and are resistant to abrasion, impact, moisture and organic solvents. They afford a high degree of corrosion protection to the metal surface and are relatively clear and colorless.

The properties of a film comprising the thermoset resin of this invention are shown by a series of experiments in which the products of Examples 1–4, 7 and 8 are applied to a vapor-degreased steel surface by drawing down and are subsequently baked for 10 minutes at 177° C. The coated surfaces are then tested by the Pencil Hardness Test, in which the film is subjected to pressure applied by a standard pencil held at a 45° angle. Pressure is applied to the film surface until either the point of the pencil is crushed or the surface of the film is penetrated. A set of 17 pencils ranging in hardness from 6B (the softest) to 9H (the hardest) is used, starting with the hardest, so that the first pencil point to be crushed before penetration of the film is a measure of the hardness of the film. The scale of hardness is as follows (from softest to hardest): 6B, 5B, 4B, 3B, 2B, B, HB, F, H, 2H, 3H, 4H, 5H, 6H, 7H, 8H, 9H.

The films are also tested by the Solvent Resistance Test, in which two layers of a soft cotton cloth are wrapped once around the index and middle finger of one hand and thoroughly soaked with n-butyl alcohol. The fingers, covered with the cloth, are applied to the coated surface with the middle finger over the index finger so that one finger width is used, but both fingertips touch the surface. As hard a pressure as possible is exerted on the surface as the fingers are rubbed back and forth over about a 3-inch distance. The rubbing motion is continued until bare metal surface is clearly visible across the entire rubbed portion. The number of complete rubbing motions is taken as a measure of the resistance of the film to deterioration by n-butyl alcohol. The cloth is kept soaked with solvent during the rubbing operation.

The results of these two tests are shown in Table IV.

TABLE IV

| Example: | Pencil hardness | Solvent resistance |
|---|---|---|
| 1 | 3H | 50 |
| 2 | 3H | 50 |
| 3 | 3H | 50 |
| 4 | 3H | 50 |
| 7 | 4H | 50 |
| 8 | 4H | 50 |

Films of the thermoset resins of this invention may also be formed on other surfaces such as paper, fabrics, wood and the like. The properties of these surfaces are thus improved with respect to strength, appearance, feel, water resistance, wrinkling, etc.

The thermosetting compositions prepared by the method of this invention may also be used as molding and casting resins and as impregnating agents for glass fiber mats. They may also be used to advantage with other resins, notably epoxy resins.

What is claimed is:

1. A method for the preparation of a thermosetting polymeric composition of matter which comprises reacting, in the presence of a strongly alkaline reagent and in an inert solvent, an aliphatic aldehyde containing less than five carbon atoms with a polymer of a substituted acrylamide of the formula

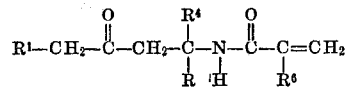

wherein $R^1$ is hydrogen or an alkyl radical, each of $R^4$ and $R^5$ is hydrogen, alkyl or aryl, and $R^6$ is hydrogen or a lower alkyl radical, the molar ratio of said aldehyde to N-3-oxohydrocarbon-substituted acrylamide units in said polymer being between about 0.1:1 and 4:1.

2. A method according to claim 1 wherein the aldehyde is formaldehyde.

3. A method according to claim 2 wherein $R^6$ is hydrogen or methyl.

4. A method according to claim 3 wherein the polymer is an interpolymer of said substituted acrylamide with one or more monomers selected from the group consisting of vinyl aromatic compounds, esters of acrylic or methacrylic acids, vinyl esters of saturated carboxylic acids, vinyl ethers, olefinic hydrocarbons, vinyl halides and unsaturated nitriles, said interpolymers containing at least about 5% by weight of said substituted acrylamide units.

5. A method according to claim 4 wherein the substituted acrylamide is diacetone acrylamide.

6. A method according to claim 5 wherein the polymer is a terpolymer of diacetone acrylamide, styrene and ethyl acrylate.

7. A method for the preparation of a thermoset resin which comprises heating a solution in an inert solvent of the product of the method of claim 1 at a temperature of at least about 100° C. until said solvent has evaporated.

8. A method according to claim 7 wherein said heating takes place in the presence of an alkaline reagent.

9. A method for the preparation of a thermoset resin which comprises heating a solution in an inert solvent of the product of the method of claim 4, in the presence of an alkaline reagent, at a temperature of at least about 100° C. until said solvent has evaporated.

10. A method for the preparation of a thermoset resin which comprises heating a solution in an inert solvent of the product of the method of claim 5, in the presence of an alkaline reagent, at a temperature of at least about 100° C. until said solvent has evaporated.

11. A thermoset composition prepared according to the method of claim 9.

12. A thermoset composition prepared according to the method of claim 10.

13. A metal article protected by a coating comprising a thermoset resin formed by the method of claim 9.

14. A metal article protected by a coating comprising a thermoset resin formed by the method of claim 10.

References Cited

UNITED STATES PATENTS

| | | | |
|---|---|---|---|
| 3,425,942 | 2/1969 | Coleman | 260—86.1 |
| 3,497,467 | 2/1970 | Coleman | 260—29.6 |
| 2,488,883 | 11/1949 | Sltokal et al. | 260—64 |

WILLIAM H. SHORT, Primary Examiner

L. L. LEE, Assistant Examiner

U.S. Cl. X.R.

117—126 GR, 148, 155 UA; 260—32.4, 33.6 UA, 65, 72 R, 89.7 R, 89.7 S